US012793704B2

(12) United States Patent
Gupta et al.

(10) Patent No.: US 12,793,704 B2
(45) Date of Patent: Nov. 10, 2026

(54) DEMONSTRATION-DRIVEN SCALABLE TASK-ORIENTED DIALOGUE MODELING

(71) Applicant: Google LLC, Mountain View, CA (US)

(72) Inventors: Raghav Gupta, Mountain View, CA (US); Yuan Cao, Mountain View, CA (US); Abhinav Kumar Rastogi, Mountain View, CA (US); Harrison J. Lee, Seattle, WA (US); Jeffrey Liangjie Zhao, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 368 days.

(21) Appl. No.: 18/148,037

(22) Filed: Dec. 29, 2022

(65) Prior Publication Data

US 2024/0221731 A1 Jul. 4, 2024

(51) Int. Cl.
*G10L 15/18* (2013.01)
*G06F 40/35* (2020.01)
*G10L 15/06* (2013.01)

(52) U.S. Cl.
CPC .......... *G10L 15/1815* (2013.01); *G06F 40/35* (2020.01); *G10L 15/063* (2013.01); *G10L 2015/0633* (2013.01)

(58) Field of Classification Search
CPC ............... G10L 15/1815; G10L 15/063; G10L 2015/0633; G10L 15/1822; G10L 15/22; G06F 40/35; G06F 40/30
See application file for complete search history.

(56) References Cited

U.S. PATENT DOCUMENTS

| | | | | |
|---|---|---|---|---|
| 10,540,967 | B2 | 1/2020 | Perez | |
| 10,860,629 | B1 | 12/2020 | Gangadharaiah | |
| 10,978,056 | B1 * | 4/2021 | Challa | G06F 16/3329 |
| 11,190,464 | B2 * | 11/2021 | Akkiraju | G09B 19/0053 |
| 11,314,790 | B2 | 4/2022 | Chang | |

(Continued)

OTHER PUBLICATIONS

Campagna et al., "Zero-Shot Transfer Learning with Synthesized Data for Multi-Domain Dialogue State Tracking," Proceedings of the 58th Annual Meeting of the Association for Computational Linguistics, Jul. 5-10, 2020, pp. 122-132.

(Continued)

*Primary Examiner* — Michael Colucci
(74) *Attorney, Agent, or Firm* — Gray Ice Higdon

(57) ABSTRACT

Example methods include determining an input prompt comprising an utterance labeled with a sequence of slot-value pairs, wherein the sequence of slot-value pairs indicates possible slots and values in the utterance, and wherein the utterance relates to a task. The methods include determining a contextual representation comprising a concatenation of a history of utterances exchanged between a user and a service agent. The utterances describe a context for the task. The methods include training, based on a concatenation of the input prompt and the contextual representation, a sequence-to-sequence language model to predict a sequence of dialog states for an input task. The sequence of dialog states comprise an assignment of values to slots for which the user has indicated a preference in dialog sequences. The methods include providing the trained sequence-to-sequence language model.

18 Claims, 10 Drawing Sheets

(56) References Cited

U.S. PATENT DOCUMENTS

| | | | | |
|---|---|---|---|---|
| 11,341,335 | B1 | 5/2022 | Crook | |
| 11,604,929 | B2 | 3/2023 | Rastogi | |
| 11,797,610 | B1 * | 10/2023 | Ferrucci | G06F 16/90332 |
| 11,804,225 | B1 | 10/2023 | Agrawal | |
| 11,948,563 | B1 * | 4/2024 | Liu | G06Q 10/1095 |
| 2005/0193055 | A1 * | 9/2005 | Angel | G06Q 10/06316 709/204 |
| 2015/0095033 | A1 | 4/2015 | Boies et al. | |
| 2017/0076295 | A1 * | 3/2017 | Vasudev | G06F 16/22 |
| 2018/0307745 | A1 | 10/2018 | Bachrach | |
| 2018/0365212 | A1 * | 12/2018 | Banerjee | H04L 51/02 |
| 2020/0184956 | A1 * | 6/2020 | Agarwal | G06F 16/3349 |
| 2020/0218780 | A1 | 7/2020 | Mei | |
| 2020/0320988 | A1 | 10/2020 | Rastogi et al. | |
| 2020/0410011 | A1 * | 12/2020 | Shi | G06F 16/90332 |
| 2021/0064828 | A1 * | 3/2021 | Johnson Premkumar | G10L 15/063 |
| 2021/0174798 | A1 | 6/2021 | Wu et al. | |
| 2022/0068255 | A1 * | 3/2022 | Chen | G10L 13/00 |
| 2022/0139384 | A1 | 5/2022 | Wu et al. | |
| 2022/0199079 | A1 * | 6/2022 | Hanson | H04L 51/02 |
| 2022/0279051 | A1 * | 9/2022 | Khemka | G06Q 10/10 |
| 2023/0120940 | A1 * | 4/2023 | Qiu | G06F 40/284 704/245 |

OTHER PUBLICATIONS

Feng et al., "A Sequence-to-Sequence Approach to Dialogue State Tracking," Proceedings of the 59th Annual Meeting of the Association for Computational Linguistics and 11th International Conference on Natural Language Processing, Aug. 1-6, 2021, pp. 1714-1725.

Gupta et al., "Show, Don't Tell: Demonstrations Outperform Descriptions for Schema-Guided Task-Oriented Dialogue," arXiv:2204.04327v1, Apr. 8, 2022, 9 pages.

Kapelonis et al., "A Multi-Task BERT Model for Schema-Guided Dialogue State Tracking," arXiv:2207.00828v1, Jul. 2, 2022, 5 pages.

Lee et al., "Dialogue State Tracking with a Language Model using Schema-Driven Prompting," Proceedings of the 2021 Conference on Empirical Methods in Natural Language Processing, Nov. 7-11, 2021, pp. 4937-4949.

Lee et al., "SGD-X: A Benchmark for Robust Generalization in Schema-Guided Dialogue Systems," arXiv:2110.06800v3, Aug. 23, 2022, 13 pages.

Li et al., "Zero-shot Generalization in Dialog State Tracking through Generative Question Answering," arXiv:2101.08333v1, Jan. 20, 2021, 11 pages.

Lin et al., "Leveraging Slot Descriptions for Zero-Shot Cross-Domain Dialogue State Tracking," arXiv:2105.04222v1, May 1, 2021, 9 pages.

Reynolds et al., "Prompt Programming for Large Language Models: Beyond the Few-Shot Paradigm," arXiv2102.07350v1, Feb. 15, 2021, 10 pages.

Zhao et al., "Description-Driven Task-Oriented Dialog Modeling," arXiv:2201.08904v1, Jan. 21, 2022.

Zhao et al., "Simple and Effective Zero-Shot Task-Oriented Dialogue," Google AIBlog, Apr. 13, 2022, 6 pages.

Zhao et al., Talk to papers: Bringing neural question answering to academic search, arXiv preprint arXiv:2004.02002, pp. 1-7, dated Apr. 4, 2020.

Rastogi et al, Towards scalable multi-domain conversational agents: The schema-guided dialogue dataset; In Proceedings of the AAAI conference on artificial intelligence , vol. 34, No. 05, pp. 8689-8696, dated 2020.

Han et al., "Multiwoz 2.3: A multi-domain task-oriented dialogue dataset enhanced with annotation corrections and co-reference annotation", In Natural Language Processing and Chinese Computing: 10th CCF International Conference, Qingdao, China, pp. 1-12, dated Jun. 2021.

Liang et al, "Attention guided dialogue state tracking with sparse supervision", arXiv preprint arXiv:2101.11958, pp. 1-10, dated Jan. 28, 2021.

Cao et al, "A comparative study on schema-guided dialogue state tracking", InProceedings of the 2021 conference of the north american chapter of the association for computational linguistics: Human language technologies, (pp. 782-796), dated Jun. 2021.

Kim et al, "Dialogue State Tracking with Zero-Shot and Few-Shot Learning for Generalization: A Review.", In 2022 International Conference on Platform Technology and Service (PlatCon), (pp. 75-79). IEEE, dated Aug. 22, 2022.

* cited by examiner

305

| Model | All | Seen | Unseen |
|---|---|---|---|
| MRC+WD-DST* | 86.5 | 92.4 | 84.6 |
| T5-seq | 86.4 | **95.8** | 83.3 |
| T5-ind | 87.7 | 95.3 | 85.2 |
| SDT-ind | 87.5±0.9 | 95.2±0.7 | 85.0±1.4 |
| SDT-seq | **88.8±0.5** | **95.8±0.2** | **86.4±0.7** |

310

| Model | Attraction | Hotel | Restaurant | Taxi | Train | Avg |
|---|---|---|---|---|---|---|
| TRADE | 20.1 | 14.2 | 12.6 | 59.2 | 22.4 | 25.7 |
| SUMBT | 22.6 | 19.8 | 16.5 | 59.5 | 22.5 | 28.2 |
| TransferQA | 31.3 | 22.7 | 26.3 | 61.9 | 36.7 | 35.8 |
| T5-seq | **76.1** | 28.6 | 69.8 | **87.0** | 60.4 | 64.4 |
| SDT-seq | 73.2 | **34.2** | **71.9** | 83.7 | **68.4** | **66.3** |

FIG. 3

DEMONSTRATION-DRIVEN SCALABLE TASK-ORIENTED DIALOGUE MODELING

BACKGROUND

Many modern computing devices, including mobile phones, personal computers, and tablets, include task-oriented dialogue (TOD) systems that identify key information from conversations for the completion of given tasks. Such information is conventionally specified in terms of intents and slots contained in task-specific ontology or schemata.

SUMMARY

Building universal TOD systems that can seamlessly operate across multiple domains/APIs and generalize to new ones with minimal supervision and maintenance can be challenging. Traditional TOD systems are unable to adapt to new verticals for an existing TOD system because the intents and slots are hard-coded into the model. The techniques described herein enable addition of new verticals. In some aspects, natural language descriptions for schema elements can be leveraged to enable such TOD systems. Accordingly, in one embodiment, slots and intents can be replaced with natural language descriptions. However, such natural language descriptions generally convey schema semantics in an indirect manner that may hinder the configuration of schemas for a seamless addition of new verticals to an existing TOD system. Accordingly, in another embodiment, demonstrations can be used to describe slot-intent pairs.

For example, the schemata used by TOD systems are generally designed in a manner that the naming convention for slots and intents is not uniform across tasks, and may not be effective in conveying semantics associated with the task. This can lead to models that memorize arbitrary patterns in data, resulting in suboptimal performance and unnecessary generalization. Furthermore, the need to collect training data separately for each vertical, in order to train machine learning models, can be tedious and expensive.

In one aspect, a prompt format for sequence-to-sequence modeling is described. Such a modeling uses a short labeled example dialogue to show the semantics of schema elements rather than tell the model via descriptions. The use of short examples as schema representations with large language models can result in stronger performance and better generalization.

In one aspect, a computer-implemented method for demonstration-driven dialog state tracking in a task-oriented dialog system is provided. The method includes determining an input prompt comprising an utterance labeled with a sequence of slot-value pairs, wherein the sequence of slot-value pairs indicates possible slots and values in the utterance, and wherein the utterance relates to a task. The method also includes determining a contextual representation comprising a concatenation of a history of utterances exchanged between a user and a service agent, wherein the utterances describe a context for the task. The method additionally includes training, based on a concatenation of the input prompt and the contextual representation, a sequence-to-sequence language model to predict a sequence of dialog states for an input task, wherein the sequence of dialog states comprises an assignment of values to slots for which the user has indicated a preference in dialog sequences corresponding to the input task. The method further includes providing the trained sequence-to-sequence language model.

In another aspect, a computing device for demonstration-driven dialog state tracking in a task-oriented dialog system is provided. The computing device includes one or more processors and data storage. The data storage has stored thereon computer-executable instructions that, when executed by one or more processors, cause the computing device to carry out operations. The operations include determining an input prompt comprising an utterance labeled with a sequence of slot-value pairs, wherein the sequence of slot-value pairs indicates possible slots and values in the utterance, and wherein the utterance relates to a task. The operations also include determining a contextual representation comprising a concatenation of a history of utterances exchanged between a user and a service agent, wherein the utterances describe a context for the task. The operations additionally include training, based on a concatenation of the input prompt and the contextual representation, a sequence-to-sequence language model to predict a sequence of dialog states for an input task, wherein the sequence of dialog states comprises an assignment of values to slots for which the user has indicated a preference in dialog sequences corresponding to the input task. The operations also include providing the trained sequence-to-sequence language model.

In another aspect, an article of manufacture for demonstration-driven dialog state tracking in a task-oriented dialog system is provided. The article of manufacture includes one or more computer readable media having computer-readable instructions stored thereon that, when executed by one or more processors of a computing device, cause the computing device to carry out operations. The operations include determining an input prompt comprising an utterance labeled with a sequence of slot-value pairs, wherein the sequence of slot-value pairs indicates possible slots and values in the utterance, and wherein the utterance relates to a task. The operations also include determining a contextual representation comprising a concatenation of a history of utterances exchanged between a user and a service agent, wherein the utterances describe a context for the task. The operations additionally include training, based on a concatenation of the input prompt and the contextual representation, a sequence-to-sequence language model to predict a sequence of dialog states for an input task, wherein the sequence of dialog states comprises an assignment of values to slots for which the user has indicated a preference in dialog sequences corresponding to the input task. The operations also include providing the trained sequence-to-sequence language model.

In another aspect, a system for demonstration-driven dialog state tracking in a task-oriented dialog system is provided. The system includes means for determining an input prompt comprising an utterance labeled with a sequence of slot-value pairs, wherein the sequence of slot-value pairs indicates possible slots and values in the utterance, and wherein the utterance relates to a task; means for determining a contextual representation comprising a concatenation of a history of utterances exchanged between a user and a service agent, wherein the utterances describe a context for the task; means for training, based on a concatenation of the input prompt and the contextual representation, a sequence-to-sequence language model to predict a sequence of dialog states for an input task, wherein the sequence of dialog states comprises an assignment of values to slots for which the user has indicated a preference in dialog sequences corresponding to the input task; means for providing the trained sequence-to-sequence language model.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 3 illustrates performance of the SDT dialogue state tracking on test datasets, in accordance with example embodiments.

DETAILED DESCRIPTION

Figure 1A:
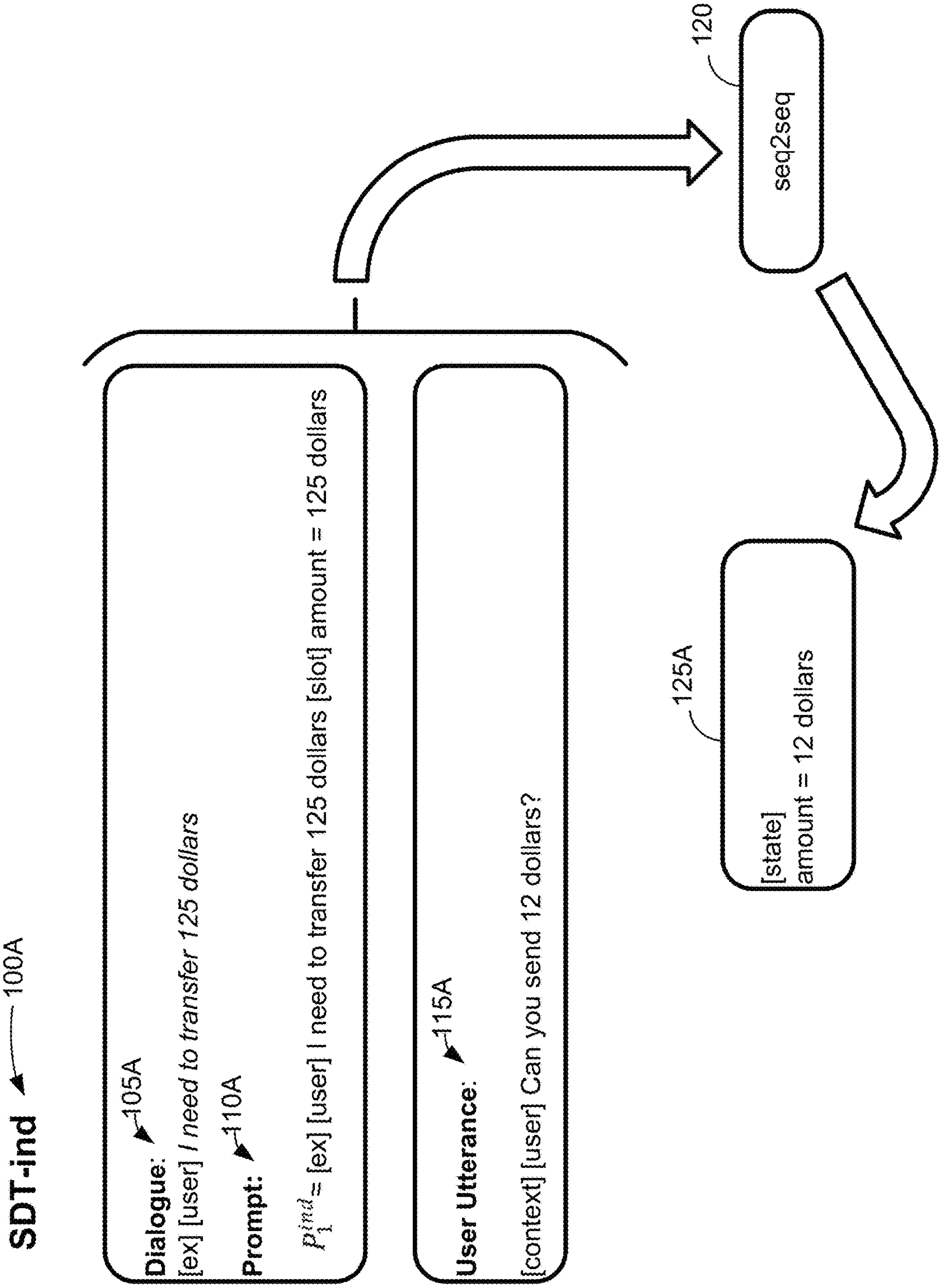
FIG. 1A illustrates an example prompt format with independent decoding of a dialogue state, in accordance with example embodiments.

Conversational agents are deployed to integrate with a number of different services to perform a wide variety of tasks. Such tasks may involve making travel reservations, such as hotel, flight, train, cruise, car rentals, and so forth. Also, for example, the tasks may involve playing media content, such as music, videos, etc. As another example, the tasks may involve reading excerpts from a book, a newspaper, telling jokes, submitting articles for publication in conferences and journals, creating a travel itinerary, finding routes, assisting with shopping, and so forth.

Generally, TOD systems are configured for a specific task, and it may be challenging to make them universally applicable to a wide variety of different tasks. Often, separate training, based on separate training data, may be needed to train the TOD system. Such training is generally based on a single task-specific ontology. An ontology may be represented as a list of possible user intents (e.g., if the user wants to book a flight, if the user wants to play some music, etc.) and possible parameter slots to extract from the conversation (e.g., the date of the flight, the name of a song, and so on). A rigid ontology can be limiting, preventing the TOD system from generalizing to new tasks or domains. For instance, a TOD model trained on a certain ontology may be able to detect the intents in that ontology, but may lack an ability to generalize such knowledge to unseen intents. This may be true for new ontologies that overlap with existing ontologies known to the agent. For example, an agent may already know how to book train tickets. However, adding the ability to book airline tickets may require training on new data related to the airline reservation system. Ideally, it is desirable for a service agent to be able to leverage existing knowledge from one ontology, and apply it to new ones.

Some new benchmarks, such as the Schema Guided Dialogue (SGD) dataset, have been designed to evaluate the ability to generalize to unseen tasks, by distilling each ontology into a schema of slots and intents. In the SGD setting, TOD models are trained on multiple schemas, and evaluated on how well they generalize to unseen ones, instead of how well they overfit to a single ontology.

To address this technical problem of generalizing a model to apply to unseen tasks based on training in one domain, a sequence-to-sequence (seq2seq) approach toward zero-shot transfer for dialogue modeling is described herein. For example, a show, don't tell model is described. The model may be conditioned on single demonstrative examples. Results on multiple dialogue state tracking benchmarks indicate that by doing away with fixed schemas and ontologies of existing models, the new approach described herein can lead to state-of-the-art results on the dialogue state tracking task with more efficient models.

In some examples, a trained TOD model can work on a variety of computing devices, including but not limited to, mobile computing devices (e.g., smart phones, tablet computers, cell phones, laptop computers), stationary computing devices (e.g., desktop computers), and server computing devices.

In one example, a copy of the trained model can reside on a mobile computing device. The trained model can generate a predicted output that predicts dialog states for an input task. In other examples, the trained model is not resident on the mobile computing device; rather, the mobile computing device provides the input to a remotely-located trained model (e.g., via the Internet or another data network). The remotely-located model can process the input and provide the output to the mobile computing device. In other examples, non-mobile computing devices can also use the trained model.

As such, the herein-described techniques can improve dialog state tracking and generalize to unseen tasks, and/or domains, thereby enhancing the actual and/or perceived quality and effectiveness of digital virtual assistants. Enhancing the actual and/or perceived quality and effectiveness of digital virtual assistants can therefore provide benefits by making services more accurate and efficient. These techniques are flexible, and so can apply a wide variety of tasks and domains.

Introduction and Overview

The design of a task-oriented dialog (TOD) system conventionally starts with defining a schema specifying the information required to complete its tasks, such as a list of relevant slots and intents. Models that are trained using such schemata may be dependent on abbreviations, making it challenging to extract the semantics of the task related conversation. This is especially true for decoder-only or sequence-to sequence (seq2seq) TOD models, which are often trained with supervision to predict dialogue belief states as sequences of these notations.

Such an approach may have several disadvantages. For example, the element notations may fail to convey semantic (and possibly ambiguous) meaning for the requirements of the slot, potentially undermining language understanding. As another example, task-specific abstract schema notations make it easy for a model to overfit on observed tasks and fail to transfer to unseen ones, even in situations where there may be sufficient semantic similarity between the two. Also, for example, creating notations for each slot and intent may complicate the schema design process.

Described herein are TOD schemata with a short labeled example dialogue to show the semantics of schema elements rather than tell the model via descriptions. This would be easier for both the designer of the TOD system when specifying the task ontology, and can also play an important role in improving model quality and data efficiency.

Show, Don't Tell (SDT) Model

Although natural language descriptions can be used for schema elements, descriptions typically convey schema semantics in an indirect manner. Some approaches to TOD that can generalize to new services primarily rely on combining two techniques: large language models like BERT and T5, and schema-guided modeling i.e. using natural language descriptions of schema elements (e.g., intents and slots) as model inputs to enable inference on unseen services. However, providing precise natural language descriptions requires manual effort and can be challenging (e.g., fail to convey the semantic context of a conversation). Also, descriptions provide indirect supervision of how to interact with a service compared to an example. Accordingly, a Show, Don't Tell (SDT) model is described herein. The SDT model uses a prompt format for seq2seq modeling which uses a short labeled example dialogue to show the semantics of schema elements rather than tell the model via descriptions. For example, a single annotated dialogue example that indicates (i.e., shows or demonstrates) the possible slots and values in a conversation may be used, instead of relying on slot descriptions. In this sense, the model is "shown" the semantics of the schema rather than "told" through descriptions. SDT may be built on T5, and may improve zero-shot performance.

The rationale for SDT's single example demonstration is that there may be ambiguities that are not entirely captured in a slot or intent description, and that require a concrete example to demonstrate. Moreover, from a developer's standpoint, creating short dialogue examples to describe a schema can often be easier than writing natural language descriptions that are capable of capturing the meaning behind each slot and intent in their entirety.

As described herein, during finetuning and evaluation, the model input may include a prompt and a context, and a target that includes ground truth belief states. The individual SDT model (SDT-ind) may include a prompt $$P_i^{ind}$$

comprising a single utterance labeled with a slot value pair formatted as:

$$P_i^{ind} = [ex]; u_i^{ind}; [\text{slot}]; sv_i \quad \text{(Eqn. 1)}$$

where $$u_i^{ind}$$

is a user utterance where slot i is active, and $sv_i$ is the corresponding slot value pair. Also, [ex], [slot] may be special delimiter tokens, and ";" may be used to denote concatenation.

Similarly, the sequential SDT model (SDT-seq) may include a prompt $p^{seq}$ comprising a single labeled dialogue formatted as:

$$P^{seq} = [ex]; u_1; \ldots ; u_n; [\text{slot}]; sv_1; \ldots ; sv_m \quad \text{(Eqn. 2)}$$

where $u_j$ is an utterance, where slot i is active and $sv_i$ is the slot value pair. Also, [ex], [slot] are special delimiter tokens, and ";" denotes concatenation. The prompt can be constructed by sequentially concatenating utterances in the example dialogue followed by corresponding slot-value pairs in the final dialogue state.

In some embodiments, the context in both formats (e.g., SDT-ind, SDT-seq) may be a concatenation of the dialogue history for the current training example. The final model input can be formed by concatenating the prompt and the context strings. Also, for example, a target string can be a single slot value for SDT-ind models, and an entire turn's belief state for SDT-seq models.

FIG. 1A illustrates an example prompt format with independent decoding of a dialogue state (SDT-ind), in accordance with example embodiments. For example, in SDT-ind 100A, an unannotated dialogue 105A is provided. Prompt 110A $$P_1^{ind},$$

demonstrates an annotated dialogue. Prompt 110A includes a single user utterance $$u_1^{ind},$$

"I need to transfer 125 dollars." A slot is active and corresponds to the "amount", and the slot value $sv_1$ corresponds to the value "125 dollars." Such a short labeled example dialogue that shows the semantics of schema elements by demonstrating the slot, "amount" and the value "125 dollars" in a conversation is provided as a prompt format to seq2seq model 120. A single user utterance 115A, "Can you send 12 dollars?" is input to seq2seq model 120, which then learns to predict active schema element states, and corresponding values, and outputs state prediction sequence 125A that comprises the predicted states. For example, the predicted states for the user utterance 115A is "amount=12 dollars."

Figure 1B:
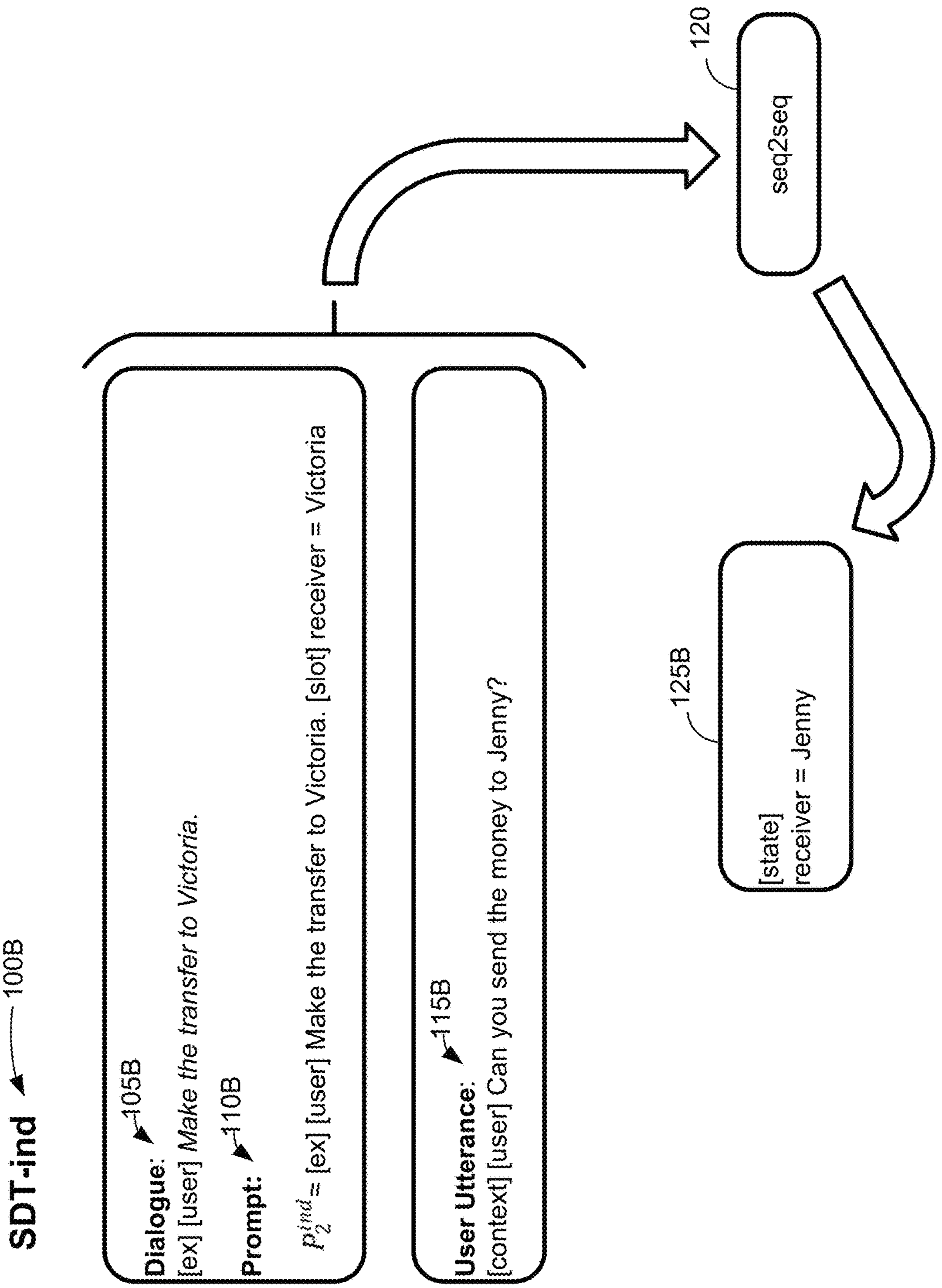
FIG. 1B illustrates another example prompt format with independent decoding of a dialogue state, in accordance with example embodiments.

FIG. 1B illustrates another example prompt format with independent decoding of a dialogue state (SDT-ind), in accordance with example embodiments. For example, in SDT-ind 100B, an unannotated dialogue 105B is provided. Prompt 110B $$P_2^{ind},$$

demonstrates an annotated dialogue corresponding to unannotated dialogue 105B. Prompt 110B includes a single user utterance $$u_2^{ind},$$

"Make the transfer to Victoria." A slot is active and corresponds to the "receiver", and the slot value $sv_2$ corresponds to the value "Victoria." Such a short labeled example dialogue that shows the semantics of schema elements by demonstrating the slot, "receiver" and the value, "Victoria" in a conversation is provided as a prompt format to seq2seq model 120. A single user utterance 115B, "Can you send money to Jenny?" is input to seq2seq model 120, which then learns to predict active schema element states, and corresponding values, and outputs state prediction sequence 125B that comprises the predicted states. For example, the predicted states for the user utterance 115B is "receiver=Jenny."

Figure 1C:
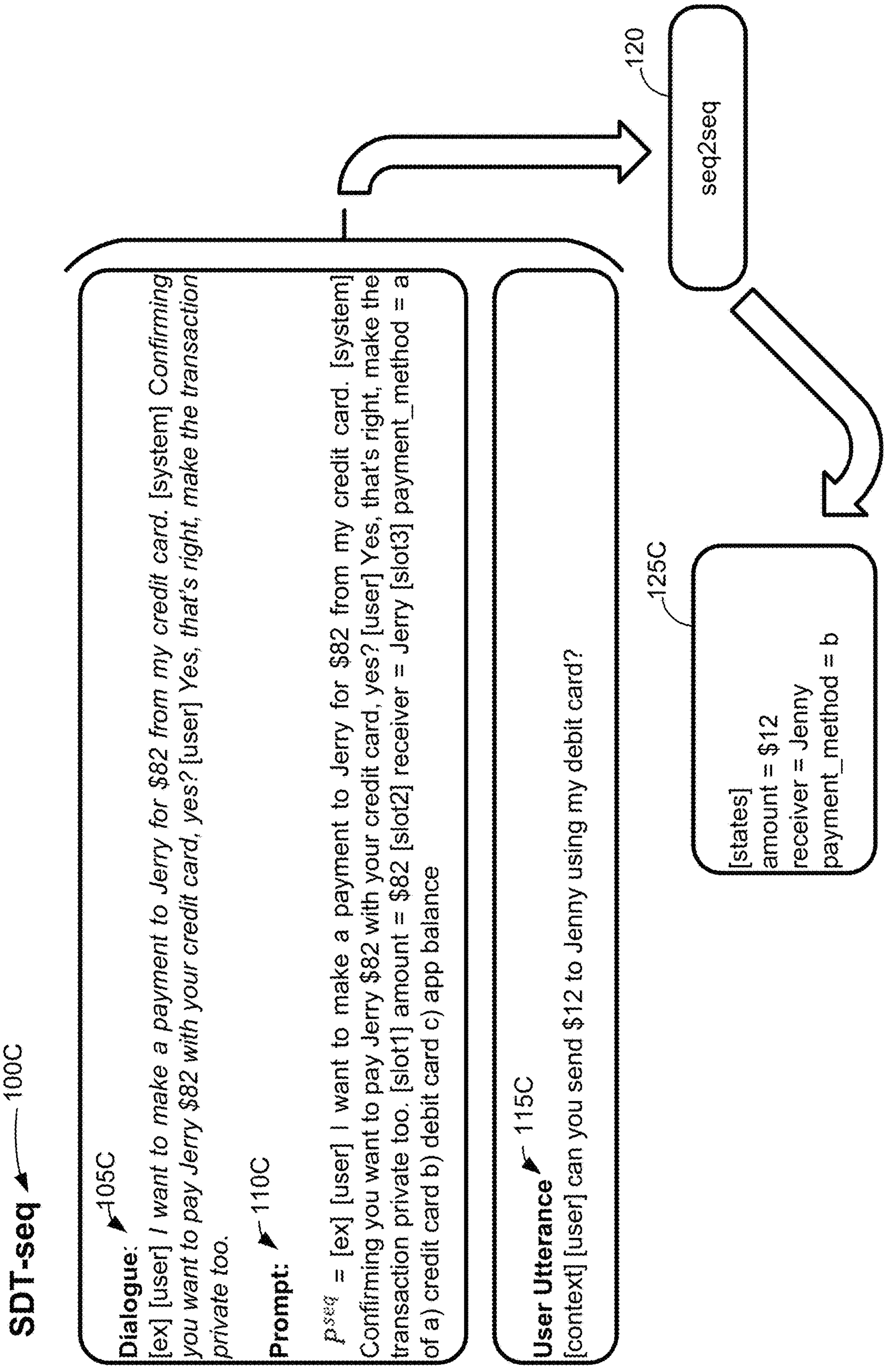
FIG. 1C illustrates an example prompt format with sequential decoding of a dialogue state, in accordance with example embodiments.

FIG. 1C illustrates an example prompt format with sequential decoding of a dialogue state (SDT-seq), in accordance with example embodiments. In this case, a dialogue may include multiple rounds of conversations, and multiple slots may be demonstrated and inferred. For example, SDT-seq 100C includes an unannotated dialogue 105B that includes a sequence of user utterances, such as, "[user] I want to make a payment to Jerry for $82 from my credit card." [system] Confirming you want to pay Jerry $82 with your credit card, yes? [user] Yes, that's right, make the transaction private too."

Prompt 110C, $p^{seq}$, includes an annotated dialogue corresponding to unannotated dialogue 105C. A number of slot-value pairs are provided, such as slot1-value1, "amount=$82," slot2-value2, "receiver=Jerry," and slot3-value3, "payment_method=a" where categorical values are indicated as "a) credit card b) debit card c) app balance."

Such a short labeled example dialogue that shows the semantics of schema elements by demonstrating the possible slots, "amount," "receiver," and "payment_method," and respective values "$82," "Jerry," and "a" in the dialogue is provided as a prompt format to seq2seq model 120. A user utterance 115C, "Can you send $12 to Jenny using my debit card?" is input to seq2seq model 120, which then learns to predict active schema element states, such as slot-value pairs, and outputs state prediction sequence 125C that comprises the predicted states. For example, the predicted states for the user utterance 115C are "amount=$12," "receiver=Jenny," and "payment_method=b."

Figure 2:
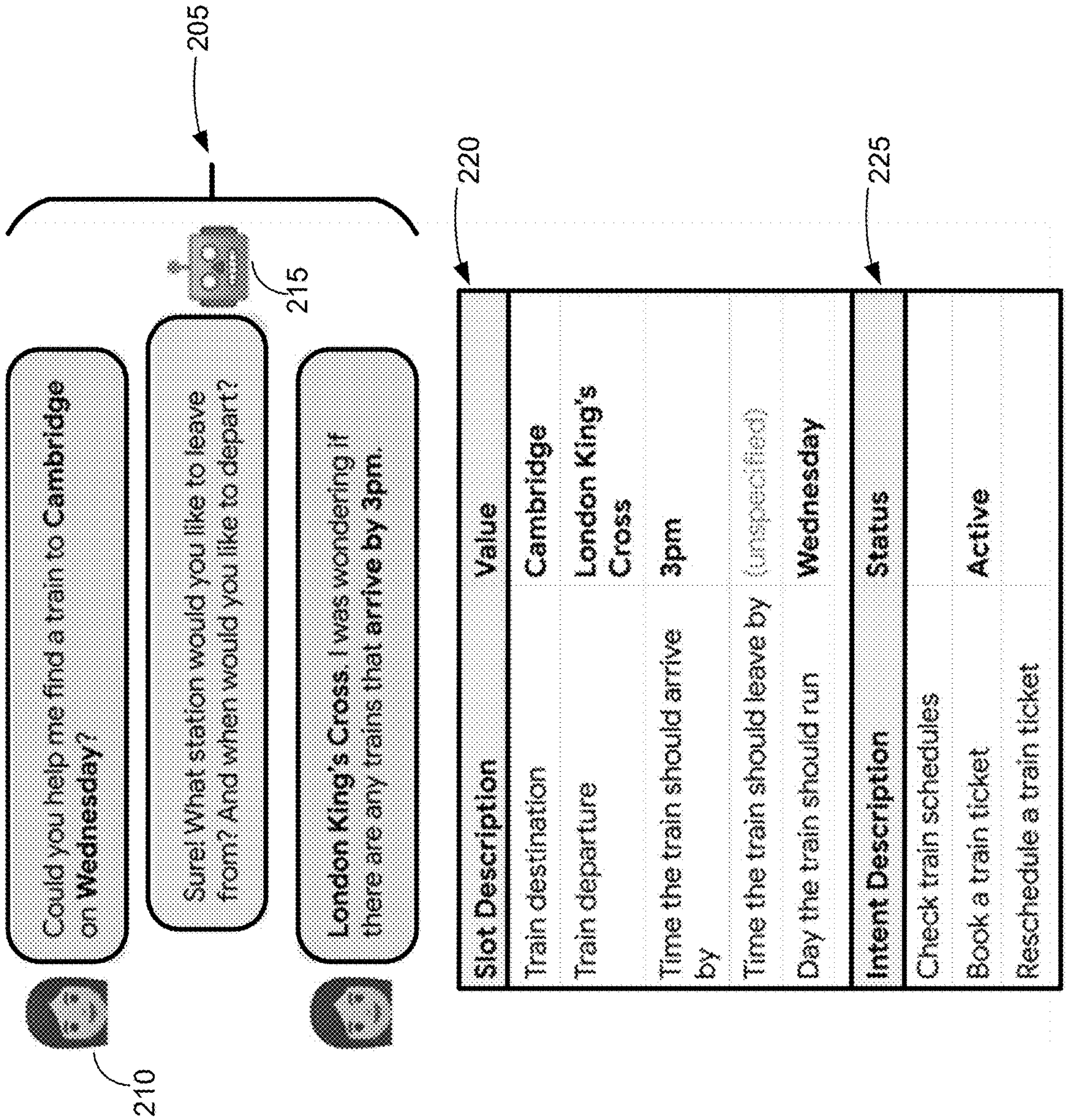
FIG. 2 illustrates an example conversation and corresponding ground truth slots and intents for SDT dialogue state tracking, in accordance with example embodiments.

FIG. 2 illustrates an example conversation and corresponding ground truth slots and intents for SDT dialogue state tracking, in accordance with example embodiments. An example dialog 205 between a user 210 seeking a service, and a virtual assistant 215, is illustrated. Slot-value pairs 220 illustrate predicted slot descriptions with corresponding values. Also illustrated are intent-status pairs 225 that illustrate intent descriptions with corresponding categorical values.

In some embodiments, categorical slot values may be enumerated in a multiple-choice format in the prompt and task models with decoding a correct multiple choice letter. It may be desirable for SDT prompts to include sufficient information to infer the semantics for all slots in the schema. This may be an easy task for SDT-ind models, where a separate prompt for each slot may be used. However, for SDT-seq models, example dialogues may use all slots in the schema.

In some embodiments, a training dataset such as MultiWOZ 2.1-2.4, and Schema-guided Dialogue (SGD) may be used. Generally, the MultiWOZ dataset may include annotation errors, and pre-processing procedures may be applied, such as a TRADE script to pre-process MultiWOZ 2.1. However, pre-processing may not be applied to versions 2.2-2.4 for reproducibility and fair comparison with existing results. In some embodiments, Joint Goal Accuracy (JGA) may be used as an evaluation metric. The JGA measures the percentage of turns across conversations for which states are correctly predicted by the model.

In some embodiments, SDT models may be trained by fine tuning pretrained T5 1.1 checkpoints. For both SGD and MultiWOZ 2.1 datasets, one example prompt per service schema (for SDT-seq) or slot (for SDT-ind), may be used, and the same prompt may be used for all examples for that service/slot across training and evaluation. In some embodiments, T5-based models (T5/SDT seq/ind) may be fine-tuned on T5-XXL (e.g., with 11 billion parameters).

The SDT model may use the Schema-guided Dialogue (SGD) and MultiWOZ 2.1 datasets for evaluation. For example, a leave-one-out setup procedure may be used, where models are trained on all domains but one, and evaluated on the holdout domain. Additionally, a TRADE pre-processing script may be applied. For both datasets, concise prompt dialogues modeled after dialogues observed in the datasets may be used.

FIG. 3 illustrates performance of the SDT dialogue state tracking on test datasets, in accordance with example embodiments. Table 305 illustrates results on the SGD test set. Since SDT results may depend on the choice of example turn/dialogue provided in the prompt, five different versions of prompts are created for each service using different examples. Average JGA across these versions are shown and the 95% confidence intervals. SDT-seq may achieve the highest JGA, showing significant gains, particularly on unseen services, over its description-based counterpart T5-seq and the next-best model T5-ind. SDT-ind is comparable to its counterpart T5-ind, and better than T5-seq. Based on these results, conveying service semantics via a single dialogue example appears to be more effective than using natural language descriptions.

Generally, SDT-seq may outperform SDT-ind because the full dialogue prompts used in SDT-seq demonstrate more complex linguistic patterns (e.g. co-reference resolution, long term dependencies) than the single utterance prompts of SDT-ind. On the other hand, T5-seq does not generally outperform T5-ind because no additional information is conveyed to the model through stacking descriptions. Also all-else-equal, decoding all slots in one pass may be more challenging than decoding each slot independently.

Table 310 summarizes results for the MultiWOZ 2.1 leave-one-out setup. Comparing T5-seq and SDTseq, both fine-tuned on T5-XXL, SDT appears to achieve state-of-the-art results on the overall task by +2% and in three of the five domains.

In some embodiments, use of demonstrations as language model prompts to convey the semantics of APIs may be more advantageous than natural language descriptions for TOD. While taking similar effort to construct, demonstrations may outperform description-based prompts across DST datasets (SGD and Multi WOZ), model sizes, and training data sizes, while being more robust to changes in schemata. Accordingly, developers of TOD systems may have more options for API representations to enable transfer to unseen services.

T5 checkpoints used herein are available publicly. In some embodiments, a sequence length of 2048, a dropout of 10% and a batch size of 16 may be used. Also, for example, a constant learning rate of 1e-3 or 1e-4 may be used. Models may be trained for 50,000 steps or until convergence is achieved.

The information provided to SDT is not identical to what is provided to typical schema-guided models, as SDT exchanges natural language descriptions for a demonstration of identifying slots in a dialogue. However, from the developer standpoint, creating a single example is similar in effort to writing descriptions. For example, creating the SDT-seq prompts for all 45 services in SGD may take an experienced annotator approximately two hours, compared to approximately 1.5 hours for generating slot descriptions. SDT-ind prompts may be simpler to write because they relax the requirement for creating a coherent dialogue where all slots are used. However, given the performance gain, example-based prompts may be a better choice for many settings, especially for smaller model sizes where the gain is more pronounced. Although training with descriptions has proven effective for improving DST performance, demonstrations appear to be more effective.

Training Machine Learning Models for Generating Inferences/Predictions

Figure 4:
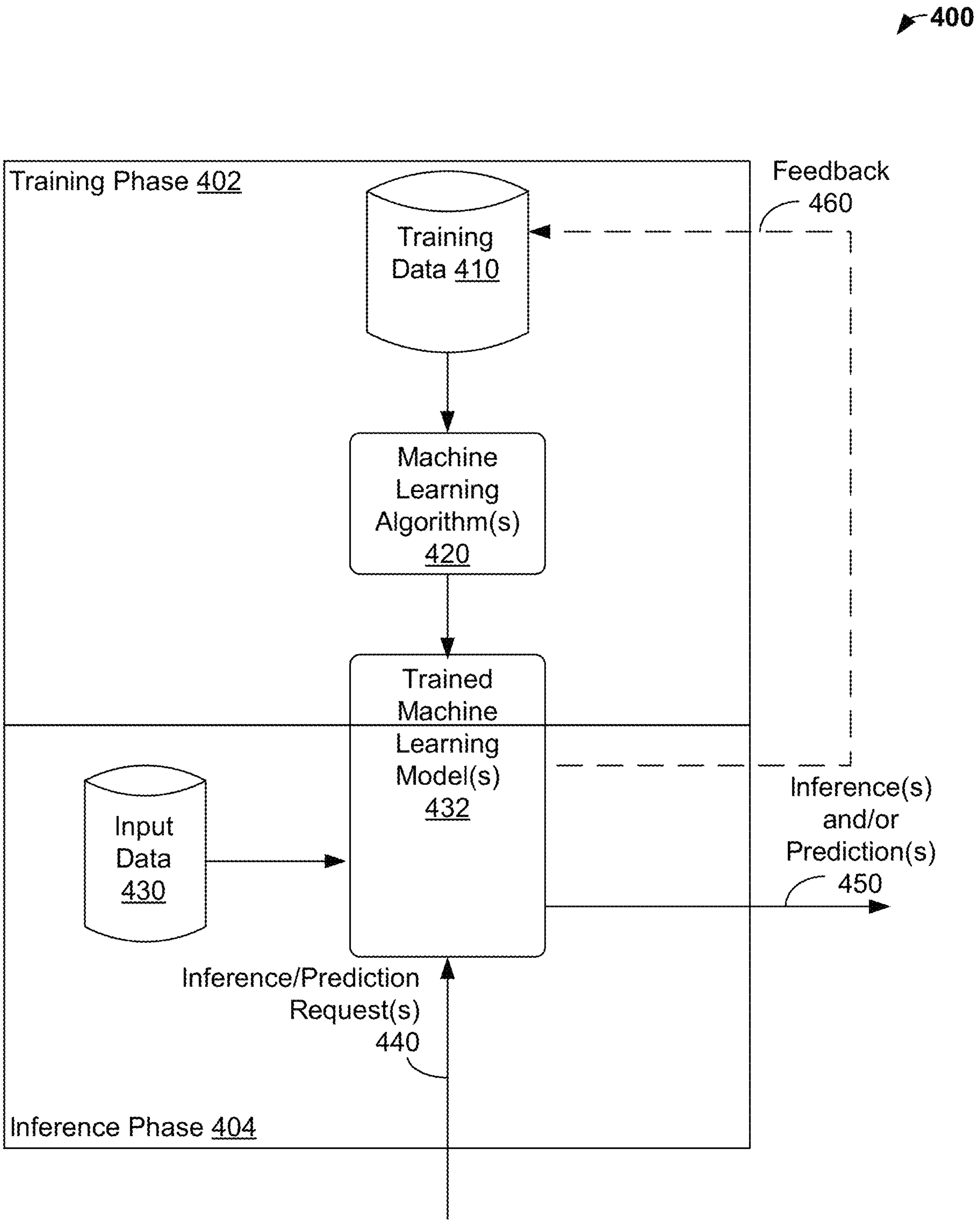
FIG. 4 is a diagram illustrating training and inference phases of a machine learning model, in accordance with example embodiments.

FIG. 4 shows diagram 400 illustrating a training phase 402 and an inference phase 404 of trained machine learning model(s) 432, in accordance with example embodiments. Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. For example, FIG. 4 shows training phase 402 where one or more machine learning algorithms 420 are being trained on training data 410 to become trained machine learning model 432. Then, during inference phase 404, trained machine learning model 432 can receive input data 430 (e.g., input prompt and context) and one or more inference/prediction requests 440 (perhaps as part of input data 430) and responsively provide as an output one or more inferences and/or predictions 450 (e.g., predict a sequence of dialogue states).

As such, trained machine learning model(s) 432 can include one or more models of one or more machine learning algorithms 420. Machine learning algorithm(s) 420 may include, but are not limited to: an artificial neural network (e.g., a convolutional neural networks, a recurrent neural network, a Bayesian network, a hidden Markov model, a Markov decision process, a logistic regression function, a support vector machine, a suitable statistical machine learning algorithm, a large language model, and/or a heuristic machine learning system). Machine learning algorithm(s) 420 may be supervised or unsupervised, and may implement any suitable combination of online and offline learning.

In some examples, machine learning algorithm(s) 420 and/or trained machine learning model(s) 432 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 420 and/or trained machine learning model(s) 432. In some examples, trained machine learning model(s) 432 can be trained, reside and execute to provide inferences on a particular computing device, and/or otherwise can make inferences for the particular computing device.

During training phase 402, machine learning algorithm(s) 420 can be trained by providing at least training data 410 as training input using unsupervised, supervised, semi-supervised, and/or weakly supervised learning techniques. Unsupervised learning involves providing a portion (or all) of training data 410 to machine learning algorithm(s) 420 and machine learning algorithm(s) 420 determining one or more output inferences based on the provided portion (or all) of training data 410. Supervised learning involves providing a portion of training data 410 to machine learning algorithm(s) 420, with machine learning algorithm(s) 420 determining one or more output inferences based on the provided portion of training data 410, and the output inference(s) are either accepted or corrected based on correct results associated with training data 410. In some examples, supervised learning of machine learning algorithm(s) 420 can be governed by a set of rules and/or a set of labels for the training input, and the set of rules and/or set of labels may be used to correct inferences of machine learning algorithm(s) 420.

Semi-supervised learning involves having correct labels for part, but not all, of training data 410. During semi-supervised learning, supervised learning is used for a portion of training data 410 having correct results, and unsupervised learning is used for a portion of training data 410 not having correct results. In some examples, machine learning algorithm(s) 420 and/or trained machine learning model(s) 432 can be trained using other machine learning techniques, including but not limited to, incremental learning and curriculum learning.

In some examples, machine learning algorithm(s) 420 and/or trained machine learning model(s) 432 can use transfer learning techniques. For example, transfer learning techniques can involve trained machine learning model(s) 432 being pre-trained on one set of data and additionally trained using training data 410. More particularly, machine learning algorithm(s) 420 can be pre-trained on data from one or more computing devices and a resulting trained machine learning model provided to a particular computing device, where the particular computing device is intended to execute the trained machine learning model during inference phase 404. Then, during training phase 402, the pre-trained machine learning model can be additionally trained using training data 410, where training data 410 can be derived from kernel and non-kernel data of the particular computing device. This further training of the machine learning algorithm(s) 420 and/or the pre-trained machine learning model using training data 410 of the particular computing device's data can be performed using either supervised or unsupervised learning. Once machine learning algorithm(s) 420 and/or the pre-trained machine learning model has been trained on at least training data 410, training phase 402 can be completed. The trained resulting machine learning model can be utilized as at least one of trained machine learning model(s) 432.

In particular, once training phase 402 has been completed, trained machine learning model(s) 432 can be provided to a computing device, if not already on the computing device. Inference phase 404 can begin after trained machine learning model(s) 432 are provided to the computing device.

During inference phase 404, trained machine learning model(s) 432 can receive input data 430 and generate and output one or more corresponding inferences and/or predictions 450 about input data 430. As such, input data 430 can be used as an input to trained machine learning model(s) 432 for providing corresponding inference(s) and/or prediction (s) 450 to kernel components and non-kernel components. For example, trained machine learning model(s) 432 can generate inference(s) and/or prediction(s) 450 in response to one or more inference/prediction requests 440. In some examples, trained machine learning model(s) 432 can be executed by a portion of other software. For example, trained machine learning model(s) 432 can be executed by an inference or prediction daemon to be readily available to provide inferences and/or predictions upon request. Input data 430 can include data from the computing device executing trained machine learning model(s) 432 and/or input data from one or more computing devices other than the computing device.

Input data 430 can be different for different models. For example, for the SDT model, input data 430 can include a single labeled description and the conversation history as context.

Inference(s) and/or prediction(s) 450 can include a sequence of dialog states, and/or other output data produced by trained machine learning model(s) 432 operating on input data 430 (and training data 410). In some examples, trained machine learning model(s) 432 can use output inference(s) and/or prediction(s) 450 as input feedback 460. Trained machine learning model(s) 432 can also rely on past inferences as inputs for generating new inferences.

Seq2seq model 120 can be an example of machine learning algorithm(s) 420. After training, the trained version of seq2seq model 120, can be an example of trained machine learning model(s) 432. In this approach, an example of inference/prediction request(s) 440 can be a request to predict a sequence of dialog states, and a corresponding example of inferences and/or prediction(s) 450 can be an output indicating the predicted sequence of dialog states. In some examples, a given computing device can include the trained neural network 300, perhaps after training neural network 300. Then, the given computing device can receive requests to predict a sequence of dialog states, and use the trained neural network to generate a prediction of the sequence of dialog states.

In some examples, two or more computing devices can be used to provide the sequence of dialog states sequence of dialog states to a second computing device. Then, the second computing device can use the trained versions of neural networks, perhaps after training, to generate a prediction of the sequence of dialog states, and respond to the requests from the first computing device for the prediction of the sequence of dialog states, upon reception of responses to the requests, the first computing device can provide the requested output (e.g., using a user interface and/or a display, a printed copy, an electronic communication, etc.).

Example Data Network

Figure 5:
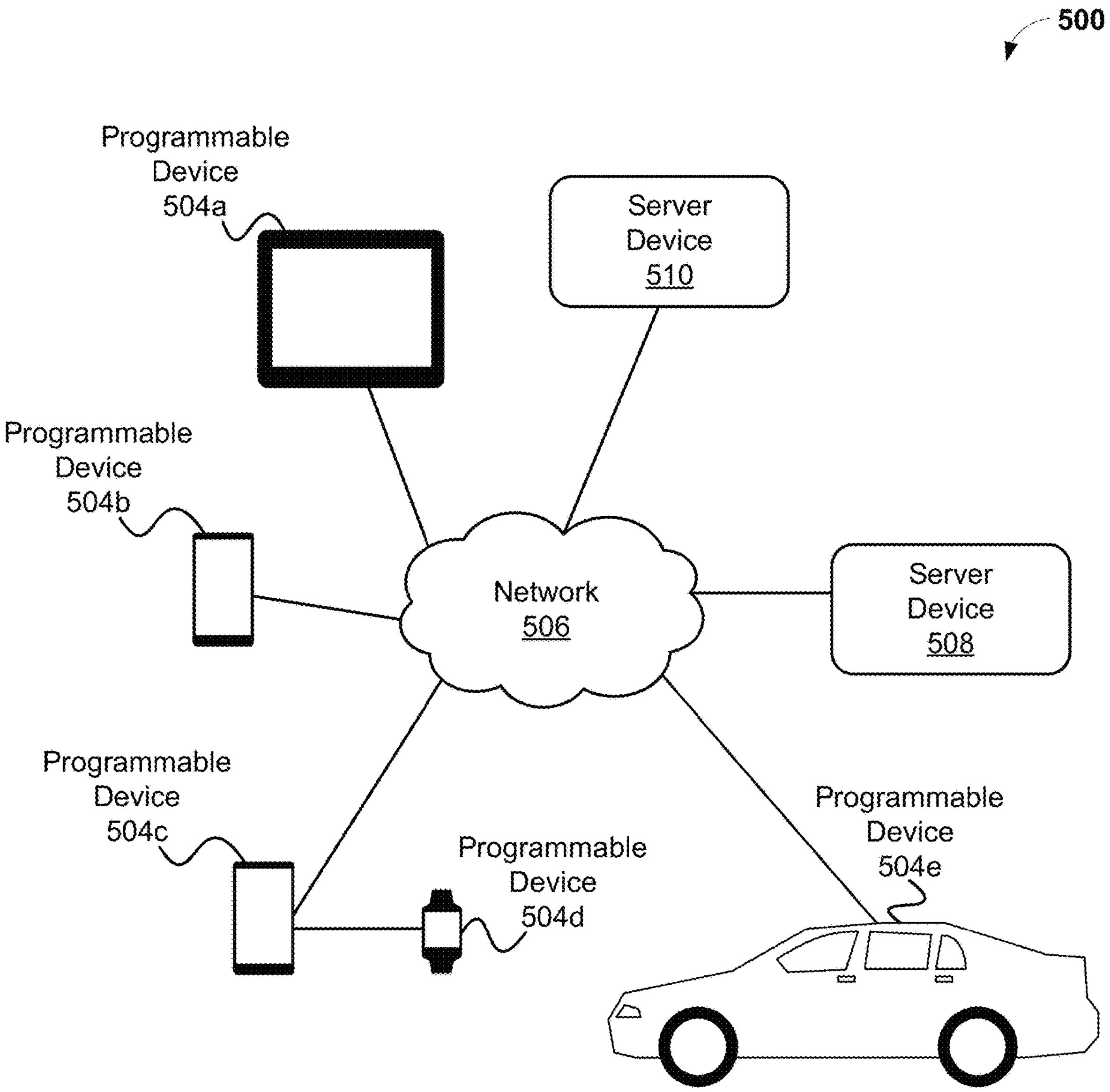
FIG. 5 depicts a distributed computing architecture, in accordance with example embodiments.

FIG. 5 depicts a distributed computing architecture 500, in accordance with example embodiments. Distributed computing architecture 500 includes server devices 508, 510 that are configured to communicate, via network 506, with programmable devices 504*a*, 504*b*, 504*c*, 504*d*, 504*e*. Network 506 may correspond to a local area network (LAN), a wide area network (WAN), a WLAN, a WWAN, a corporate intranet, the public Internet, or any other type of network configured to provide a communications path between networked computing devices. Network 506 may also correspond to a combination of one or more LANs, WANs, corporate intranets, and/or the public Internet.

Although FIG. 5 only shows five programmable devices, distributed application architectures may serve tens, hundreds, or thousands of programmable devices. Moreover, programmable devices 504*a*, 504*b*, 504*c*, 504*d*, 504*e* (or any additional programmable devices) may be any sort of computing device, such as a mobile computing device, desktop computer, wearable computing device, head-mountable device (HMD), network terminal, a mobile computing device, and so on. In some examples, such as illustrated by programmable devices 504*a*, 504*b*, 504*c*, 504*e*, programmable devices can be directly connected to network 506. In other examples, such as illustrated by programmable device 504*d*, programmable devices can be indirectly connected to network 506 via an associated computing device, such as programmable device 504*c*. In this example, programmable device 504*c* can act as an associated computing device to pass electronic communications between programmable device 504*d* and network 506. In other examples, such as illustrated by programmable device 504*e*, a computing device can be part of and/or inside a vehicle, such as a car, a truck, a bus, a boat or ship, an airplane, etc. In other examples not shown in FIG. 5, a programmable device can be both directly and indirectly connected to network 506.

Server devices 508, 510 can be configured to perform one or more services, as requested by programmable devices 504*a*-504*e*. For example, server device 508 and/or 510 can provide content to programmable devices 504*a*-504*e*. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 508 and/or 510 can provide programmable devices 504*a*-504*e* with access to software for database, search, computation, graphical, audio, video, World Wide Web/Internet utilization, and/or other functions. Many other examples of server devices are possible as well.

Computing Device Architecture

Figure 6:
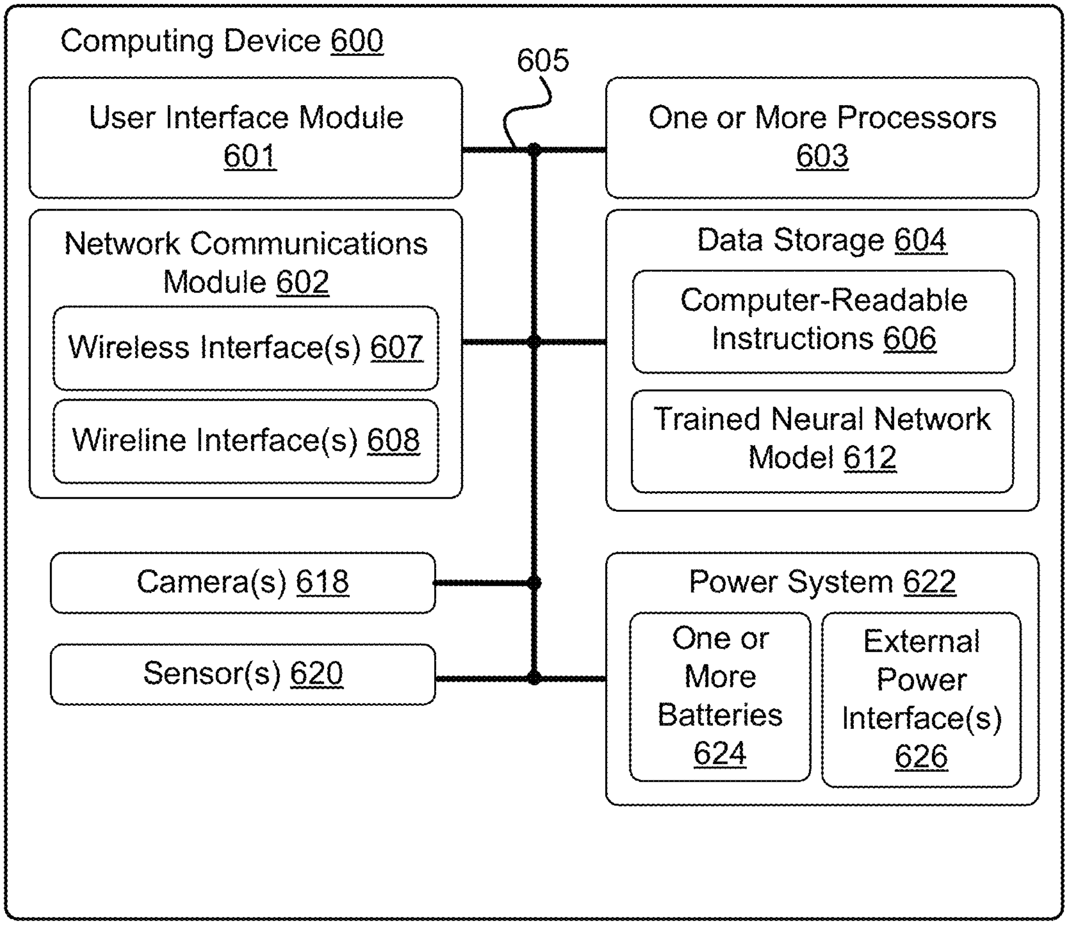
FIG. 6 is a block diagram of a computing device, in accordance with example embodiments.

FIG. 6 is a block diagram of an example computing device 600, in accordance with example embodiments. In particular, computing device 600 shown in FIG. 6 can be configured to perform at least one function of and/or related to seq2seq model 120, and/or methods 800 and/or 900.

Computing device 600 may include a user interface module 601, a network communications module 602, one or more processors 603, data storage 604, one or more cameras 618, one or more sensors 620, and power system 622, all of which may be linked together via a system bus, network, or other connection mechanism 605.

User interface module 601 can be operable to send data to and/or receive data from external user input/output devices, including an application programming interface (API). For example, user interface module 601 can be configured to send and/or receive data to and/or from user input devices such as a touch screen, a computer mouse, a keyboard, a keypad, a touch pad, a trackball, a joystick, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible outputs, with devices such as a speaker, speaker jack, audio output port, audio output device, earphones, and/or other similar devices. User interface module 601 can further be configured with one or more haptic devices that can generate haptic outputs, such as vibrations and/or other outputs detectable by touch and/or physical contact with computing device 600. In some examples, user interface module 601 can be used to provide a graphical user interface (GUI) for utilizing computing device 600. For example, user interface module 601 can be used to provide task processing options, menus, editable forms, selectable icons, and so forth. Also, for example, user interface module 601 can be used to receive user selection of user choices. The user interface module 601 can be used to provide a textual or audio interface for a user to communicate with a service agent, such as a virtual assistant configured to assist with the completion of a task.

Network communications module 602 can include one or more devices that provide one or more wireless interfaces 607 and/or one or more wireline interfaces 608 that are configurable to communicate via a network. Wireless interface(s) 607 can include one or more wireless transmitters, receivers, and/or transceivers, such as a Bluetooth™ transceiver, a Zigbee® transceiver, a Wi-Fi™ transceiver, a WiMAX™ transceiver, an LTE™ transceiver, and/or other type of wireless transceiver configurable to communicate via a wireless network. Wireline interface(s) 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 602 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 603 can include one or more general purpose processors, and/or one or more special purpose processors (e.g., digital signal processors, tensor processing units (TPUs), graphics processing units (GPUs), application specific integrated circuits, etc.). One or more processors 603 can be configured to execute computer-readable instructions 606 that are contained in data storage 604 and/or other instructions as described herein.

Data storage 604 can include one or more non-transitory computer-readable storage media that can be read and/or accessed by at least one of one or more processors 603. The one or more computer-readable storage media can include volatile and/or non-volatile storage components, such as optical, magnetic, organic or other memory or disc storage, which can be integrated in whole or in part with at least one of one or more processors 603. In some examples, data storage 604 can be implemented using a single physical device (e.g., one optical, magnetic, organic or other memory or disc storage unit), while in other examples, data storage 604 can be implemented using two or more physical devices.

Data storage 604 can include computer-readable instructions 606 and perhaps additional data. In some examples, data storage 604 can include storage required to perform at least part of the herein-described methods, scenarios, and techniques and/or at least part of the functionality of the herein-described devices and networks. In some examples, data storage 604 can include storage for a trained neural network model 612 (e.g., a model of seq2seq model 120, etc.). In particular of these examples, computer-readable instructions 606 can include instructions that, when executed by processor(s) 603, enable computing device 600 to provide for some or all of the functionality of trained neural network model 612.

In some examples, computing device 600 can include one or more cameras 618. Camera(s) 618 can include one or more image capture devices, such as still and/or video cameras, equipped to capture videos. The one or more images can be one or more images utilized in video imagery. Camera(s) 618 can capture light and/or electromagnetic radiation emitted as visible light, infrared radiation, ultraviolet light, and/or as one or more other frequencies of light.

In some examples, computing device 600 can include one or more sensors 620. Sensors 620 can be configured to measure conditions within computing device 600 and/or conditions in an environment of computing device 600 and provide data about these conditions. For example, sensors 620 can include one or more of: (i) sensors for obtaining data about computing device 600, such as, but not limited to, a thermometer for measuring a temperature of computing device 600, a battery sensor for measuring power of one or more batteries of power system 622, and/or other sensors measuring conditions of computing device 600; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (iii) sensors to measure locations and/or movements of computing device 600, such as, but not limited to, a tilt sensor, a gyroscope, an accelerometer, a Doppler sensor, a GPS device, a sonar sensor, a radar device, a laser-displacement sensor, and a compass; (iv) an environmental sensor to obtain data indicative of an environment of computing device 600, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor and/or a smoke sensor; and/or (v) a force sensor to measure one or more forces (e.g., inertial forces and/or G-forces) acting about computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 620 are possible as well.

Power system 622 can include one or more batteries 624 and/or one or more external power interfaces 626 for providing electrical power to computing device 600. Each battery of the one or more batteries 624 can, when electrically coupled to the computing device 600, act as a source of stored electrical power for computing device 600. One or more batteries 624 of power system 622 can be configured to be portable. Some or all of one or more batteries 624 can be readily removable from computing device 600. In other examples, some or all of one or more batteries 624 can be internal to computing device 600, and so may not be readily removable from computing device 600. Some or all of one or more batteries 624 can be rechargeable. For example, a rechargeable battery can be recharged via a wired connection between the battery and another power supply, such as by one or more power supplies that are external to computing device 600 and connected to computing device 600 via the one or more external power interfaces. In other examples, some or all of one or more batteries 624 can be non-rechargeable batteries.

One or more external power interfaces 626 of power system 622 can include one or more wired-power interfaces, such as a USB cable and/or a power cord, that enable wired electrical power connections to one or more power supplies that are external to computing device 600. One or more external power interfaces 626 can include one or more wireless power interfaces, such as a Qi wireless charger, that enable wireless electrical power connections, such as via a Qi wireless charger, to one or more external power supplies. Once an electrical power connection is established to an external power source using one or more external power interfaces 626, computing device 600 can draw electrical power from the external power source the established electrical power connection. In some examples, power system 622 can include related sensors, such as battery sensors associated with the one or more batteries or other types of electrical power sensors.

Cloud-Based Servers

Figure 7:
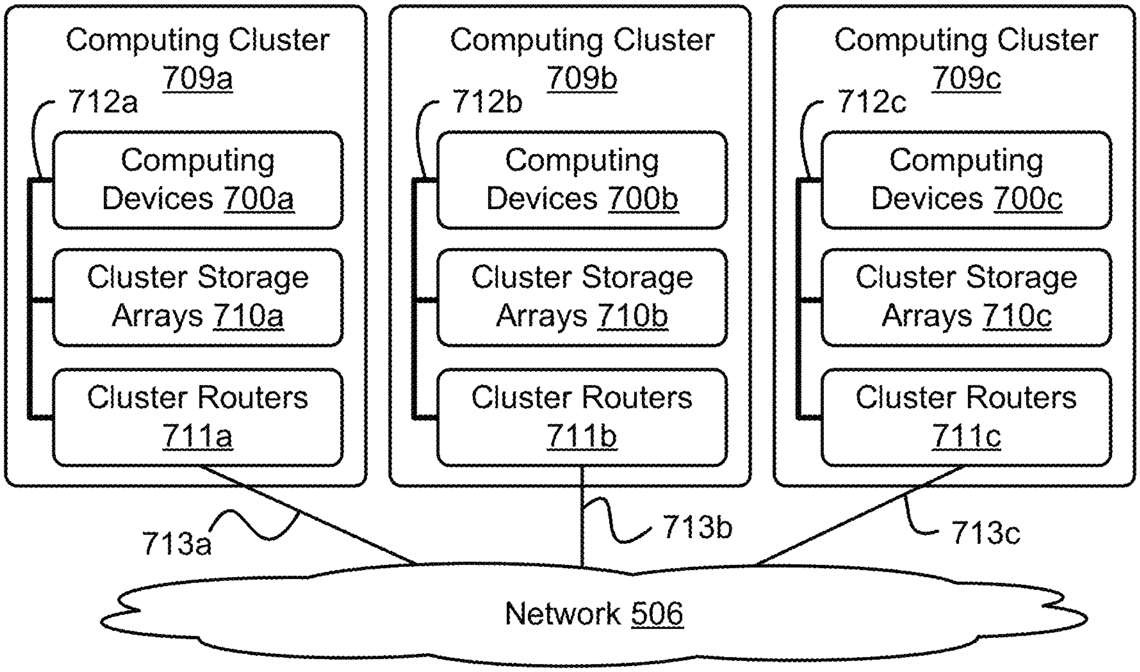
FIG. 7 depicts a network of computing clusters arranged as a cloud-based server system, in accordance with example embodiments.

FIG. 7 depicts a network 506 of computing clusters 709*a*, 709*b*, 709*c* arranged as a cloud-based server system in accordance with an example embodiment. Computing clusters 709*a*, 709*b*, 709*c* can be cloud-based devices that store program logic and/or data of cloud-based applications and/or services; e.g., perform at least one function of and/or related to seq2seq model 120, and/or method 800.

In some embodiments, computing clusters 709*a*, 709*b*, 709*c* can be a single computing device residing in a single computing center. In other embodiments, computing clusters 709*a*, 709*b*, 709*c* can include multiple computing devices in a single computing center, or even multiple computing devices located in multiple computing centers located in diverse geographic locations. For example, FIG. 7 depicts each of computing clusters 709*a*, 709*b*, and 709*c* residing in different physical locations.

In some embodiments, data and services at computing clusters 709*a*, 709*b*, 709*c* can be encoded as computer readable information stored in non-transitory, tangible computer readable media (or computer readable storage media) and accessible by other computing devices. In some embodiments, computing clusters 709*a*, 709*b*, 709*c* can be stored on a single disk drive or other tangible storage media, or can be implemented on multiple disk drives or other tangible storage media located at one or more diverse geographic locations.

FIG. 7 depicts a cloud-based server system in accordance with an example embodiment. In FIG. 7, functionality of seq2seq model 120, and/or a computing device can be distributed among computing clusters 709*a*, 709*b*, 709*c*. Computing cluster 709*a* can include one or more computing devices 700*a*, cluster storage arrays 710*a*, and cluster routers 711*a* connected by a local cluster network 712*a*. Similarly, computing cluster 709*b* can include one or more computing devices 700*b*, cluster storage arrays 710*b*, and cluster routers 711*b* connected by a local cluster network 712*b*. Likewise, computing cluster 709*c* can include one or more computing devices 700*c*, cluster storage arrays 710*c*, and cluster routers 711*c* connected by a local cluster network 712*c*.

In some embodiments, each of computing clusters 709*a*, 709*b*, and 709*c* can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709*a*, for example, computing devices 700*a* can be configured to perform various computing tasks of a neural network, a seq2seq model, and/or a computing device. In one embodiment, the various functionalities of a neural network, a seq2seq model, and/or a computing device can be distributed among one or more of computing devices 700*a*, 700*b*, 700*c*. Computing devices 700*b* and 700*c* in respective computing clusters 709*b* and 709*c* can be configured similarly to computing devices 700*a* in computing cluster 709*a*. On the other hand, in some embodiments, computing devices 700*a*, 700*b*, and 700*c* can be configured to perform different functions.

In some embodiments, computing tasks and stored data associated with a neural network, a seq2seq model, and/or a computing device can be distributed across computing devices 700*a*, 700*b*, and 700*c* based at least in part on the processing requirements of a neural network, a seq2seq model, and/or a computing device, the processing capabilities of computing devices 700*a*, 700*b*, 700*c*, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 710*a*, 710*b*, 710*c* of computing clusters 709*a*, 709*b*, 709*c* can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a neural network, a seq2seq model, and/or a computing device can be distributed across computing devices 700*a*, 700*b*, 700*c* of computing clusters 709*a*, 709*b*, 709*c*, various active portions and/or backup portions of these components can be distributed across cluster storage arrays 710*a*, 710*b*, 710*c*. For example, some cluster storage arrays can be configured to store one portion of the data of a neural network, a seq2seq model, and/or a computing device, while other cluster storage arrays can store other portion(s) of data of a neural network, a seq2seq model, and/or a computing device. Also, for example, some cluster storage arrays can be configured to store the data of a first neural network, while other cluster storage arrays can store the data of a second and/or third neural network. Additionally, some cluster storage arrays can be configured to store backup versions of data stored in other cluster storage arrays.

Cluster routers 711*a*, 711*b*, 711*c* in computing clusters 709*a*, 709*b*, 709*c* can include networking equipment configured to provide internal and external communications for the computing clusters. For example, cluster routers 711*a* in computing cluster 709*a* can include one or more internet switching and routing devices configured to provide (i) local area network communications between computing devices 700*a* and cluster storage arrays 710*a* via local cluster network 712*a*, and (ii) wide area network communications between computing cluster 709*a* and computing clusters 709*b* and 709*c* via wide area network link 713*a* to network 506. Cluster routers 711*b* and 711*c* can include network equipment similar to cluster routers 711*a*, and cluster routers 711*b* and 711*c* can perform similar networking functions for computing clusters 709*b* and 709*b* that cluster routers 711*a* perform for computing cluster 709*a*.

In some embodiments, the configuration of cluster routers 711*a*, 711*b*, 711*c* can be based at least in part on the data communication requirements of the computing devices and cluster storage arrays, the data communications capabilities of the network equipment in cluster routers 711*a*, 711*b*, 711*c*, the latency and throughput of local cluster networks 712*a*, 712*b*, 712*c*, the latency, throughput, and cost of wide area network links 713*a*, 713*b*, 713*c*, and/or other factors that can contribute to the cost, speed, fault-tolerance, resiliency, efficiency and/or other design criteria of the moderation system architecture.

Example Methods of Operation

Figure 8:
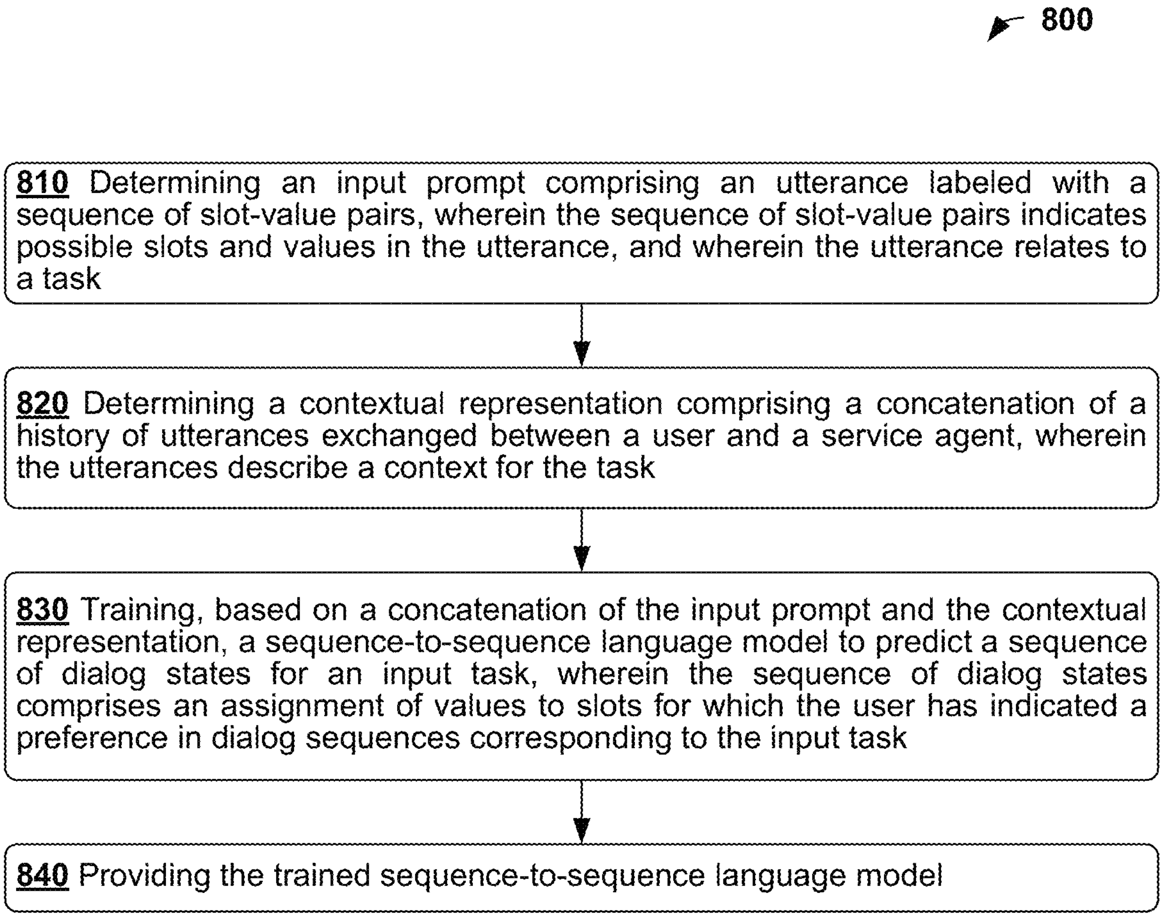
FIG. 8 is a flowchart of a method, in accordance with example embodiments.

FIG. 8 is a flowchart of a method 800, in accordance with example embodiments. Method 800 can be executed by a computing device, such as computing device 600.

Method 800 can begin at block 810, where the method involves determining an input prompt comprising an utterance labeled with a sequence of slot-value pairs, wherein the sequence of slot-value pairs indicates possible slots and values in the utterance, and wherein the utterance relates to a task.

At block 820, the method involves determining a contextual representation comprising a concatenation of a history of utterances exchanged between a user and a service agent, wherein the utterances describe a context for the task.

At block 830, the method involves training, based on a concatenation of the input prompt and the contextual representation, a sequence-to-sequence language model to predict a sequence of dialog states for an input task, wherein the sequence of dialog states comprises an assignment of values to slots for which the user has indicated a preference in dialog sequences corresponding to the input task.

At block 840, the method involves providing the trained sequence-to-sequence language model.

In some embodiments, the input prompt may include a sequence of utterances, and wherein the sequence of slot-value pairs may indicate possible slots and values in the sequence of utterances.

In some embodiments, the input prompt may be a semantic representation of the schema descriptions associated with the task.

Some embodiments involve a target comprising one or more ground truth dialog states.

Some embodiments involve receiving, via an application programming interface (API) for a task processor, API schemata comprising schema descriptions associated with a particular task. Such embodiments also involve applying the trained sequence-to-sequence language model to predict a particular sequence of dialog states for the particular task.

In some embodiments, the training of the sequence-to-sequence language model may be based on a first type of task, and wherein the applying of the trained sequence-to-sequence language model is based on a second type of task different from the first type of task.

In some embodiments, the first type of task may correspond to a railway reservation task, and the second first type of task may correspond to a research conference paper submission task.

In some embodiments, the first type of task may correspond to an airline reservation task, and the second first type of task may correspond to a blog post generation task.

In some embodiments, the training of the sequence-to-sequence language model may be based on a Schema-guided Dialogue (SGD) dataset.

In some embodiments, the training of the sequence-to-sequence language model may be based on a MultiWOZ dataset. Such embodiments may further involve applying a pre-processing script to the MultiWOZ dataset to correct one or more annotation errors.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method for improving a generalization and adaptability of a task-oriented dialog system to multiple task domains, comprising:

obtaining, by a processor, training data for training a sequence-to-sequence language model, wherein the training data comprises:

an input prompt comprising an utterance labeled with a sequence of slot-value pairs, wherein the sequence of slot-value pairs is derived from a short labeled example dialog demonstrating semantics of schema elements for a task, and wherein the utterance relates to the task;

an input task comprising an additional utterance that is in addition to the utterance, the utterance labeled with the sequence of slot-value pairs being an example for how to label the additional utterance in subsequently processing the training data using the sequence-to-sequence language model;

a contextual representation comprising a concatenation of a history of utterances exchanged between a user and a service agent, wherein the history of utterances describes a context for the input task;

and a target comprising a ground truth sequence of dialog states for the input task;

training, by the processor, the sequence-to-sequence language model, wherein training the sequence-to-sequence language model comprises:

processing, by the processor, using the sequence-to-sequence language model, a concatenation of: (i) the input prompt comprising the utterance labeled with the sequence of slot-value pairs, (ii) the input task comprising the additional utterance that is in addition to the utterance, and (iii) the contextual representation comprising the concatenation of the history of utterances exchanged between the user and the service agent to generate a predicted sequence of dialog states for the input task, wherein the predicted sequence of dialog states comprises an assignment of values to slots for the additional-utterance and for which the user has indicated a preference in dialog sequences corresponding to the input task, thereby enabling the task-oriented dialog system to adapt to a new task domain or an unseen task domain without retraining for each task domain; and updating, based on the predicted sequence of dialog states and the ground truth sequence of dialog states, the sequence-to-sequence language model; and providing, by the processor, the trained sequence-to-sequence language model to a task processor via an application programming interface (API) to enable seamless integration and operation of the task-oriented dialog system with different APIs.

2. The computer-implemented method of claim 1, wherein the input prompt comprises a sequence of utterances, and wherein the sequence of slot-value pairs indicates possible slots and values in the sequence of utterances.

3. The computer-implemented method of claim 1, wherein the input prompt is a semantic representation of schema descriptions associated with the task.

4. The computer-implemented method of claim 1, further comprising:

receiving, via the application programming interface (API) for the task processor, API schemata comprising schema descriptions associated with a particular task; and applying the trained sequence-to-sequence language model to predict a particular sequence of dialog states for the particular task.

5. The computer-implemented method of claim 4, wherein the training of the sequence-to-sequence language model is based on a first type of task, and wherein the applying of the trained sequence-to-sequence language model is based on a second type of task different from the first type of task.

6. The computer-implemented method of claim 5, wherein the first type of task corresponds to an airline reservation task, and wherein the second type of task corresponds to a blog post generation task.

7. The computer-implemented method of claim 1, wherein the training of the sequence-to-sequence language model is based on a Schema-guided Dialogue (SGD) dataset.

8. The computer-implemented method of claim 1, wherein the training of the sequence-to-sequence language model is based on a MultiWOZ dataset.

9. The computer-implemented method of claim 8, further comprising:

applying a pre-processing script to the MultiWOZ dataset to correct one or more annotation errors.

10. A computing device for improving a generalization and adaptability of a task-oriented dialog system to multiple task domains, comprising:

one or more processors; and data storage, wherein the data storage has stored thereon computer-executable instructions that, when executed by the one or more processors, cause the computing device to carry out operations comprising:

obtaining training data for training a sequence-to-sequence language model, wherein the training data comprises:

an input prompt comprising an utterance labeled with a sequence of slot-value pairs, wherein the sequence of slot-value pairs is derived from a short labeled example dialog demonstrating semantics of schema elements for a task, and wherein the utterance relates to the task;

an input task comprising an additional utterance that is in addition to the utterance, the utterance labeled with the sequence of slot-value pairs being an example for how to label the additional utterance in subsequently processing the training data using the sequence-to-sequence language model;

a contextual representation comprising a concatenation of a history of utterances exchanged between a user and a service agent, wherein the history of utterances describes a context for the input task;

and a target comprising a ground truth sequence of dialog states;

training the sequence-to-sequence language model, wherein training the sequence-to-sequence language model comprises:

processing, using the sequence-to-sequence language model, a concatenation of: (i) the input prompt comprising the utterance labeled with the sequence of slot-value pairs, (ii) the input task comprising the additional utterance that is in addition to the utterance, and (iii) the contextual representation comprising the concatenation of the history of utterances exchanged between the user and the service agent to generate a predicted sequence of dialog states for the input task, wherein the predicted sequence of dialog states comprises an assignment of values to slots for the additional utterance and for which the user has indicated a preference in dialog sequences corresponding to the input task, thereby enabling the task-oriented dialog system to adapt to a new task domain or an unseen task domain without retraining for each task domain; and updating, based on the predicted sequence of dialog states and the ground truth sequence of dialog states, the sequence-to-sequence language model; and providing the trained sequence-to-sequence language model to a task processor via an application programming interface (API) to enable seamless integration and operation of the task-oriented dialog system with different APIs.

11. The computing device of claim 10, wherein the input prompt comprises a sequence of utterances, and wherein the sequence of slot-value pairs indicates possible slots and values in the sequence of utterances.

12. The computing device of claim 10, wherein the input prompt is a semantic representation of schema descriptions associated with the task.

13. The computing device of claim 10, the operations further comprising:

receiving, via the application programming interface (API) for the task processor, API schemata comprising schema descriptions associated with a particular task; and applying the trained sequence-to-sequence language model to predict a particular sequence of dialog states for the particular task.

14. The computing device of claim 13, wherein the training of the sequence-to-sequence language model is based on a first type of task, and wherein the applying of the trained sequence-to-sequence language model is based on a second type of task different from the first type of task.

15. The computing device of claim 10, wherein the training of the sequence-to-sequence language model is based on a Schema-guided Dialogue (SGD) dataset.

16. The computing device of claim 10, wherein the training of the sequence-to-sequence language model is based on a MultiWOZ dataset.

17. The computing device of claim 16, the operations further comprising:

applying a pre-processing script to the MultiWOZ dataset to correct one or more annotation errors.

18. An article of manufacture for improving a generalization and adaptability of a task-oriented dialog system to multiple task domains, including a non-transitory computer-readable medium, having stored thereon program instructions that, upon execution by one or more processors of a computing device, cause the computing device to carry out operations comprising:

obtaining training data for training a sequence-to-sequence language model, wherein the training data comprises:

an input prompt comprising an utterance labeled with a sequence of slot-value pairs, wherein the sequence of slot-value pairs is derived from a short labeled example dialog demonstrating semantics of schema elements for a task, and wherein the utterance relates to the task;

an input task comprising an additional utterance that is in addition to the utterance, the utterance labeled with the sequence of slot-value pairs being an example for how to label the additional utterance in subsequently processing the training data using the sequence-to-sequence language model;

a contextual representation comprising a concatenation of a history of utterances exchanged between a user and a service agent, wherein the history of utterances describes a context for the input task;

and a target comprising a ground truth sequence of dialog states;

training the sequence-to-sequence language model, wherein training the sequence-to-sequence language model comprises:

processing, using the sequence-to-sequence language model, a concatenation of: (i) the input prompt comprising the utterance labeled with the sequence of slot-value pairs, (ii) the input task comprising the additional utterance that is in addition to the utterance, and (iii) the contextual representation comprising the concatenation of the history of utterances exchanged between the user and the service agent to generate a predicted sequence of dialog states for the input task, wherein the predicted sequence of dialog states comprises an assignment of values to slots for the additional-utterance and for which the user has indicated a preference in dialog sequences corresponding to the input task, thereby enabling the task-oriented dialog system to adapt to a new task domain or an unseen task domain without retraining for each task domain; and updating, based on the predicted sequence of dialog states and the ground truth sequence of dialog states, the sequence-to-sequence language model; and providing the trained sequence-to-sequence language model to a task processor via an application programming interface (API) to enable seamless integration and operation of the task-oriented dialog system with different APIs.

* * * * *